United States Patent
Zheng

(10) Patent No.: US 10,523,799 B1
(45) Date of Patent: Dec. 31, 2019

(54) FLEXIBLE DISPLAY PANEL AND ELECTRONIC DEVICE

(71) Applicant: Wuhan China Star Optoelectronics Semiconductor Display Technology Co., Ltd., Wuhan (CN)

(72) Inventor: Min Zheng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/079,111

(22) PCT Filed: Aug. 7, 2018

(86) PCT No.: PCT/CN2018/099238
§ 371 (c)(1),
(2) Date: Aug. 23, 2018

(30) Foreign Application Priority Data

Jun. 12, 2018 (CN) .......................... 2018 1 0603841

(51) Int. Cl.
| | |
|---|---|
| *G06F 1/16* | (2006.01) |
| *H04M 1/02* | (2006.01) |
| *G09F 9/30* | (2006.01) |
| *G06F 3/041* | (2006.01) |

(52) U.S. Cl.
CPC ........ *H04M 1/0268* (2013.01); *G06F 1/1652* (2013.01); *G06F 3/041* (2013.01); *G09F 9/301* (2013.01)

(58) Field of Classification Search
None
See application file for complete search history.

(56) References Cited

U.S. PATENT DOCUMENTS

| | | | | |
|---|---|---|---|---|
| 9,515,099 | B2 * | 12/2016 | Kwon | H01L 27/1244 |
| 2012/0242588 | A1 * | 9/2012 | Myers | G06F 1/1637 345/173 |
| 2013/0083496 | A1 * | 4/2013 | Franklin | G06F 1/1626 361/749 |
| 2014/0226275 | A1 * | 8/2014 | Ko | G06F 1/1626 361/679.27 |
| 2015/0277496 | A1 * | 10/2015 | Reeves | G06F 1/1641 345/1.2 |
| 2016/0007441 | A1 * | 1/2016 | Matsueda | G06F 1/1652 361/749 |
| 2016/0105542 | A1 * | 4/2016 | Lee | H04M 1/72597 455/566 |
| 2016/0179236 | A1 * | 6/2016 | Shin | G06F 1/1616 |
| 2016/0239132 | A1 * | 8/2016 | Lee | G02F 1/133305 |
| 2017/0126983 | A1 | 5/2017 | Yamazaki et al. | |
| 2018/0108714 | A1 * | 4/2018 | Odaka | G06F 1/1626 |
| 2018/0335679 | A1 * | 11/2018 | Hashimoto | G02F 1/167 |
| 2019/0005857 | A1 * | 1/2019 | Wakata | G09F 9/301 |

* cited by examiner

Primary Examiner — Xanthia C Cunningham

(57) ABSTRACT

A flexible display panel and an electronic device are described. The flexible display panel has a first bending portion and a second bending portion disposed on the flexible display panel, where the flexible display panel is divided into a first display region, a second display region, and a transition region located between the first display region and the second display region by the first bending portion and the second bending portion; and at least one opening defined in the flexible display panel and defined in one or more regions among the first display region, the second display region, and the transition region.

3 Claims, 4 Drawing Sheets

FLEXIBLE DISPLAY PANEL AND ELECTRONIC DEVICE

RELATED APPLICATIONS

This application is a National Phase of PCT Patent Application No. PCT/CN2018/099238 having International filing date of Aug. 7, 2018, which claims the benefit of priority of Chinese Patent Application No. 201810603841.X filed on Jun. 12, 2018. The contents of the above applications are all incorporated by reference as if fully set forth herein in their entirety.

FIELD AND BACKGROUND OF THE INVENTION

The present disclosure relates to a technical field of communication electronics, and more particularly to a flexible display panel and an electronic device.

With continuous development of technology, increasing display area of a front surface of a mobile phone has become a core competitiveness of the mobile phone. However, since a side-frame is needed to be placed around the display area in a conventional display screen for placement of a driving circuit, the front surface of an electronic device cannot have a full screen display, and therefore improvement of the display area is limited.

Therefore, the conventional technology has drawbacks and is in urgent need of improvement.

An embodiment of the present disclosure provides a flexible display panel and an electronic device, which has a beneficial effect of raising display area of a front surface of the electronic device.

SUMMARY OF THE INVENTION

An embodiment of the present disclosure provides a flexible display panel including: a first bending portion and a second bending portion formed at the flexible display panel, wherein the first bending portion and the second bending portion divide the flexible display panel into a first display region, a second display region, and a transition region located between the first bending portion and the second bending portion; and
at least one opening defined in the flexible display panel and defined in one or more regions among the first display region, the second display region, and the transition region;
wherein the opening is rectangular, rounded rectangular or strip-shaped;
wherein the flexible display panel comprises a flexible substrate, a TFT device layer, and a light-emitting layer;
wherein the light-emitting layer comprises a first light-emitting region and a second light-emitting layer;
wherein the first bending portion and the second bending portion are positioned on the flexible substrate; and
wherein the TFT device layer is disposed on the flexible substrate, the first light-emitting region is disposed on the TFT device layer and located at the first display region, and the second light-emitting region is disposed on the TFT device layer and located at the second display region.

In the flexible display panel described by the present disclosure, the opening is defined in the second display region and the transition region.

In the flexible display panel described by the present disclosure, the opening is defined in the second display region.

In the flexible display panel described by the present disclosure, the opening is defined in the transition region.

In the flexible display panel described by the present disclosure, the opening is defined in the first display region, the second display region, and the transition region.

An embodiment of the present disclosure further provides a flexible display panel including: a first bending portion and a second bending portion formed at the flexible display panel, wherein the first bending portion and the second bending portion divide the flexible display panel into a first display region, a second display region, and a transition region located between the first bending portion and the second bending portion; and
at least one opening defined in the flexible display panel and defined in one or more regions among the first display region, the second display region, and the transition region.

In the flexible display panel described by the present disclosure, a number of the at least one opening is two, and the two openings are defined side by side.

In the flexible display panel described by the present disclosure, the at least one opening is defined in the second display region and the transition region.

In the flexible display panel described by the present disclosure, the at least one opening is defined in the second display region.

In the flexible display panel described by the present disclosure, the at least one opening is defined in the transition region.

In the flexible display panel described by the present disclosure, the at least one opening is defined in the first display region, the second display region, and the transition region.

In the flexible display panel described by the present disclosure, the at least one opening is rectangular, rounded rectangular or strip-shaped.

In the flexible display panel described by the present disclosure, the flexible display panel includes a flexible substrate, a TFT device layer, and a light-emitting layer;
wherein the light-emitting layer comprises a first light-emitting region and a second light-emitting layer;
wherein the first bending portion and the second bending portion are positioned on the flexible substrate; and
wherein the TFT device layer is disposed on the flexible substrate, the first light-emitting region is disposed on the TFT device layer and located at the first display region, and the second light-emitting region is disposed on the TFT device layer and located at the second display region.

In the flexible display panel described by the present disclosure, the light-emitting layer further comprises a third light-emitting region disposed on the TFT device layer and located at the transition region.

In the flexible display panel described by the present disclosure, an area of the first display region is greater than an area of the second display region.

An electronic device includes:
a middle frame;
a flexible display panel disposed on the middle frame;
a first bending portion and a second bending portion formed at the flexible display panel, wherein the first bending portion and the second bending portion divide the flexible display panel into a first display region, a second display region, and a transition region located between the first bending portion and the second bending portion; and
at least one opening defined in the flexible display panel and defined in one or more regions among the first display region, the second display region, and the transition region;

wherein the first display region of the flexible display panel is positioned on a front surface of the middle frame, and the second display region of the flexible display panel is positioned on a back surface of the middle frame.

In the electronic device described by the present disclosure, the flexible display pane further includes a functional component disposed on the back surface of the middle frame, wherein an edge portion of the functional component is located in the at least one opening when the electronic device is folded.

In the electronic device described by the present disclosure, the functional component comprises a receiver and a camera.

In the electronic device described by the present disclosure, the flexible display pane further includes a functional component; and a mounting hole defined in an end of the middle frame neighboring the at least one opening, wherein the functional component is extendably mounted in the mounting hole.

In the electronic device described by the present disclosure, the middle frame includes two length-sides and two wide-sides, wherein the transition region is opposite to one of the two wide-sides or opposite to one of the two length-sides.

From above, the display screen assembly, the flexible display panel, and the electronic provided by the present disclosure have a beneficial effect of raising display area of the front surface of the electronic device by the display screen assembly and the flexible display panel.

BRIEF DESCRIPTION OF THE SEVERAL VIEWS OF THE DRAWINGS

In order to more clearly describe technical solutions in embodiments of the present disclosure, drawings required to be used for the embodiments or descriptions are simply described hereinafter. Apparently, the drawings described below only illustrate some embodiments of the present disclosure. Those skilled in the art can obtain other drawings based on these drawings disclosed herein without creative effort.

DESCRIPTION OF SPECIFIC EMBODIMENTS OF THE INVENTION

Figure 1:
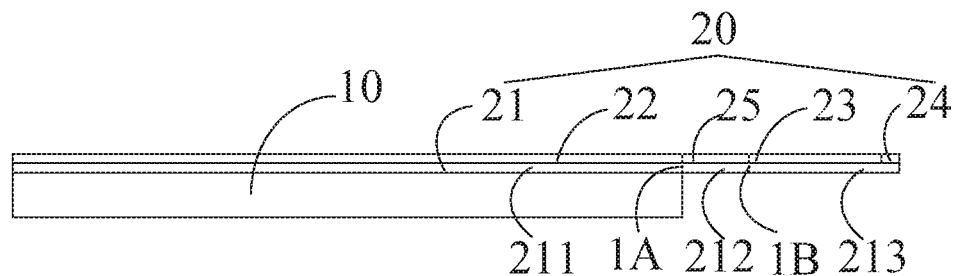
FIG. 1 is a schematic perspective structural diagram of an electronic device in some embodiments of the present disclosure.

Embodiments of the present disclosure are described in detail below, and examples of the embodiments are illustrated in drawings, wherein from beginning to end, same or similar reference numerals indicate same or similar elements or elements having the same or similar functions. The embodiments described below with reference to the drawings are merely intended to be illustrative of the disclosure and are not to be construed as limiting.

In the description of the present disclosure, it is to be understood that orientation or positional relationships of the terms of "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. are based on orientation or positional relationships shown by the figures. It is merely for the convenience of describing the present disclosure and simplifying the description, but not indicating or implying, to which a device or a component is referred, must have a specific orientation, or must be constructed and operated in a specific orientation. Therefore, it should not be construed as limiting the disclosure. Moreover, the terms "first" and "second" are merely used for descriptive purposes and are not to be construed as indicating or implying a relative importance, or as implicitly indicating the number of the indicated technical features. Thus, features defining "first" or "second" may include one or more of the described features either explicitly or implicitly. In the description of the present disclosure, the meaning of "a plurality" is two or more unless otherwise specifically defined.

In the description of the present disclosure, it should be noted that the terms of "mount", "connect with each other", and "connect" are to be understood broadly. For example, it can be a fixed connection, a detachable connection, or an integral connection. It can be a mechanical connection, or it can be electrically connected or can be communicated with each other. It can be directly connected, or can be indirectly connected through an intermediate medium. It can mean two components connected to each other internally, or an interacting relationship between two components. The specific meanings of the above terms in the present disclosure can be understood by those skilled in the art in specific conditions.

In the present disclosure, a first feature "on" or "under" a second feature can include direct contact of the first and second features, and can also include that the first and second features are not in direct contact but are contacted by additional features between them. Moreover, the meaning of the first feature being "on", "above" and "upside" the second feature includes the first feature directly above and obliquely above the second feature, or merely indicates that a horizontal height of the first feature is higher than a horizontal height of the second feature. The meaning of the first feature being "lower", "below" and "downside" the second feature includes the first feature directly lower and below the second feature, or merely indicates that a horizontal height of the first feature is less than a horizontal height of the second feature.

The following publication provides many different embodiments or examples for implementing different structures of the present disclosure. In order to simplify the publication of the present disclosure, the components and arrangements of the specific examples are described below. Of course, they are merely examples and are not intended to limit the disclosure. In addition, the present disclosure may be repeated with reference to the numerals and/or reference numerals in the various examples, which are for the purpose of simplicity and clarity, and do not indicate the relationship between the various embodiments and/or arrangements discussed. Moreover, the present disclosure provides examples of various specific processes and materials, but one of ordinary skilled in the art will recognize the use of other processes and/or the use of other materials.

Refer to FIG. 1, which is a structural diagram of an electronic device in some embodiments of the present disclosure. The electronic device includes a middle frame 10 and a flexible display panel 20. The flexible display panel 20 is disposed in a front surface of the middle frame 10. It can be understood that the electronic device 10 includes a housing or the like, and a control circuit board and other devices are also disposed in the housing so as to implement the functions of the electronic device.

A first bending portion 1A and a second bending portion 1B are formed at the flexible display panel 20, where the first bending portion 1A and the second bending portion 1B divide the flexible display panel into a first display region 211, a second display region 212, and a transition region 213 located between the first bending portion 1A and the second bending portion 1B. At least one opening is defined in the flexible display panel and defined in one or more regions among the first display region 211, the second display region, 213 and the transition region 212

The middle frame includes two length-sides and two wide-sides, where the transition region is opposite to one of the two wide-sides or opposite to one of the two length-sides. That is to say, the second display region can be folded from one of the two sides of the electronic device 10, or can be folded from a bottom side or a top side.

It can be understood that the number of the at least one opening is not limited, and can be one or plural. In the present embodiment, the number of the at least one opening is one.

Specifically, the flexible display panel 20 includes a flexible substrate 21, a TFT device layer, a light-emitting layer, a driving function layer 24, and an electrical connection wire 25. The light-emitting layer includes a first light-emitting region 22 and a second light-emitting region 23. The first bending portion 1A and the second bending portion 1B are positioned on the flexible substrate 21, and the TFT device layer is disposed on the flexible substrate. The first light-emitting region 22 and the second light-emitting region 23 are both disposed on the TFT device layer. The first light-emitting region 22 is disposed on the TFT device layer and located at the first display region 211. The second light-emitting region is disposed on the TFT device layer and located at the second display region 213. A touch-sensing layer, an encapsulation layer, and the like further are disposed on the first light-emitting region 22 and the second light-emitting region 23.

In some embodiments, the light-emitting layer further includes a third light-emitting region. The third light-emitting region is disposed on the TFT device layer and located at the transition region. A touch-sensing layer can be disposed on the third light-emitting region, and the touch-sensing layer also can be not disposed on the third light-emitting region.

In some embodiments, a light-emitting layer is not disposed on the transition region of the flexible display panel 20, but only a touch-sensing layer is disposed on the transition region of the flexible display panel 20.

The flexible substrate 21 has a substantially rectangular shape or a rounded rectangular shape.

The first light-emitting region 22 forms the first display region of the flexible display panel. The first light-emitting region 22 is an OLED light-emitting layer. The first light-emitting region 22 covers a first region 211 of the flexible substrate 21.

The electrical connection wire 25 is disposed at the transition region 212. A treatment is performed on the transition region 212 of the flexible substrate 212, so as to have a relatively good property of bending and folding. It can be understood that the transition region 212 can also be provided with a transition light-emitting layer.

The second light-emitting region 23 forms the second display region of the flexible display panel 20. The second light-emitting region 23 is an OLED light-emitting layer. The second light-emitting region 23 covers a second display region 213 of the flexible substrate 21.

The second region 213 of the flexible substrate 21 and a portion of the first region 211 face each other when being folded, and a back surface of the second region 213 is opposite to a back surface of the middle frame 10.

Figure 2:
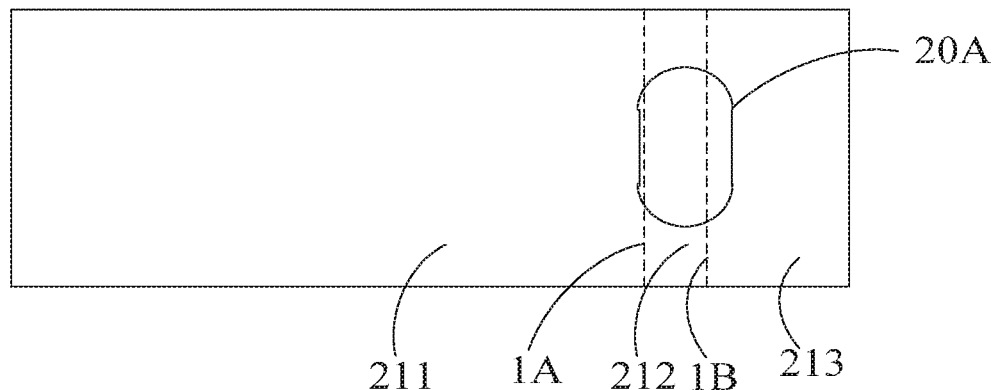
FIG. 2 is a front view of an electronic device in a first unfolded state in some embodiments of the present disclosure.
Figure 3:
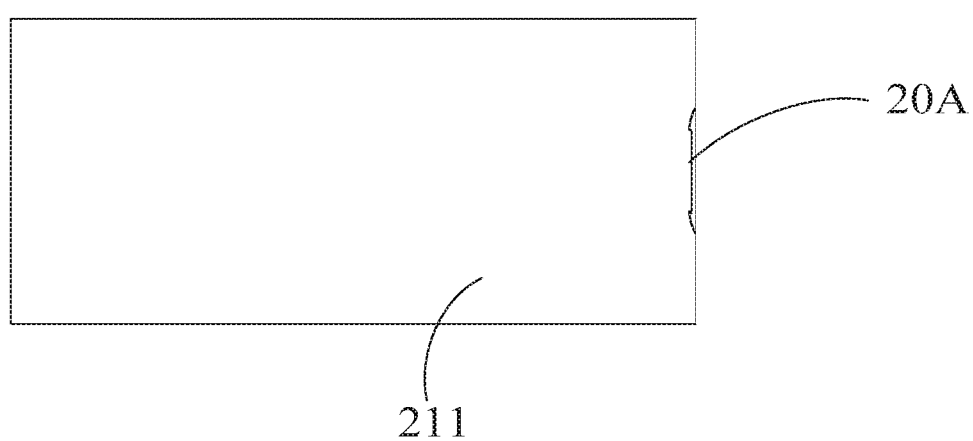
FIG. 3 is a front view of an electronic device in a first folded state in some embodiments of the present disclosure.
Figure 4:
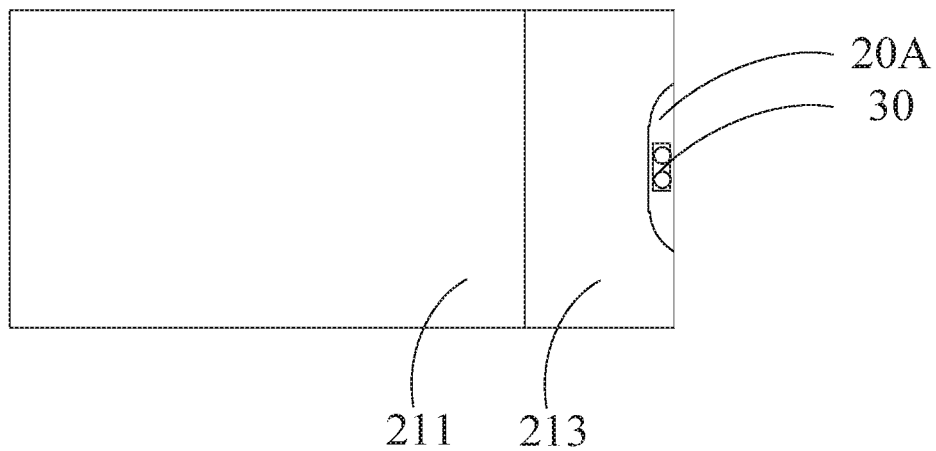
FIG. 4 is a back view of an electronic device in a first folded state in some embodiments of the present disclosure.

Referring to FIG. 2 to FIG. 4 simultaneously, the opening 20A is distributed in the transition region 212, the second display region 211, and the first display region 213, wherein the opening 20A is substantially rectangular, rounded rectangular or strip-shaped.

In the embodiment, the electronic device further includes a functional component 30. The functional component 30 is disposed on a side of the middle frame 10 neighboring the opening. When the flexible display panel 20 is in a folded status, an edge portion of the functional component 30 is located in the opening 20A, where the functional component 30 includes a camera, a receiver, etc.

In the embodiment, after being folded, the opening 20A also has a slit in the first display region 211, and the slit can be used as a receiver hole. A portion of the opening 20A located in the second region exposes the functional component 30 located at the back surface of the middle frame 10.

Figure 5:
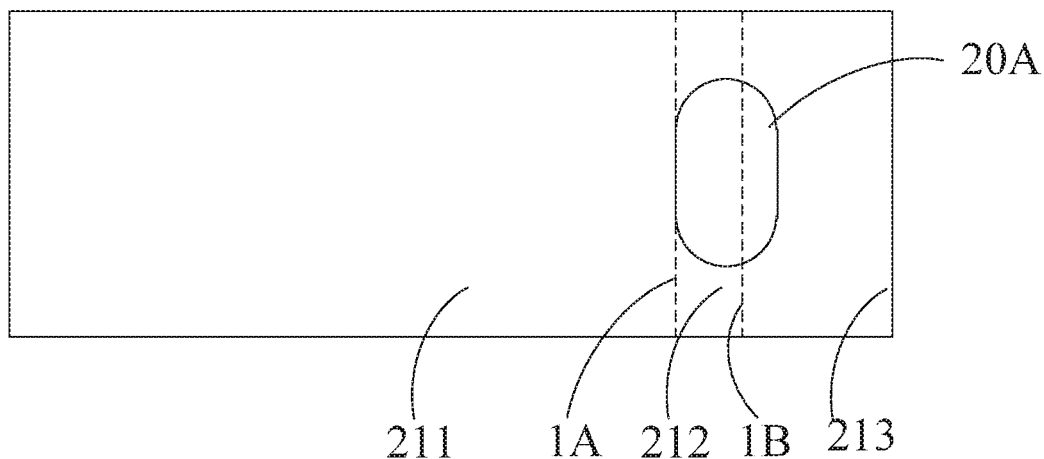
FIG. 5 is a front view of an electronic device in a second unfolded state in some embodiments of the present disclosure.
Figure 6:
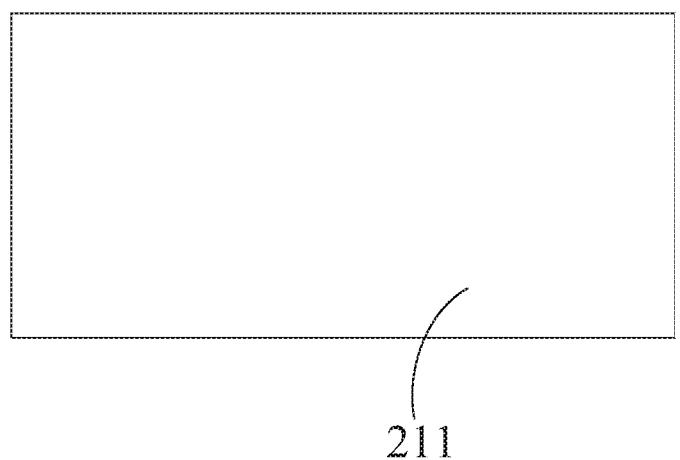
FIG. 6 is a front view of an electronic device in a second folded state in some embodiments of the present disclosure.
Figure 7:
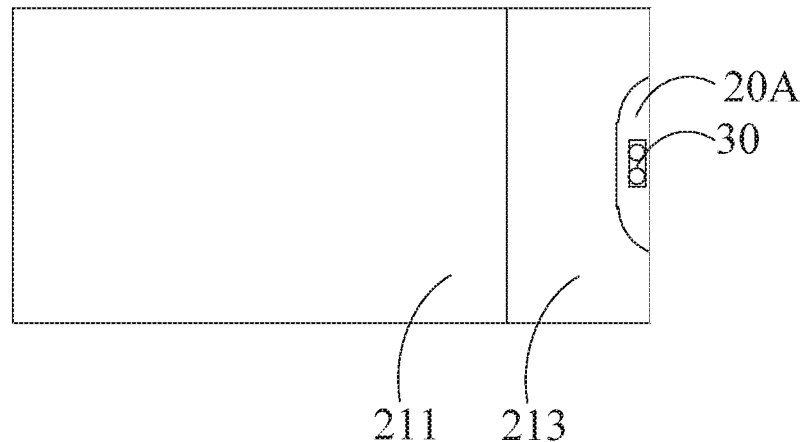
FIG. 7 is a back view of an electronic device in a second folded state in some embodiments of the present disclosure.

Referring to FIG. 5 to FIG. 7 simultaneously, the opening 20A is distributed in the transition region 212 and the second display region 211, wherein the opening 20A is substantially rectangular, rounded rectangular or strip-shaped.

In the embodiment, the electronic device further includes a functional component 30. In the embodiment, the electronic device further includes a functional component 30. The functional component 30 is disposed on a side of the middle frame 10 neighboring the opening. When the flexible display panel 20 is in a folded status, an edge portion of the functional component 30 is located in the opening 20A, where the functional component 30 includes a camera, a receiver, etc. In a front side of the electronic device just implements a completely full screen.

Figure 8:
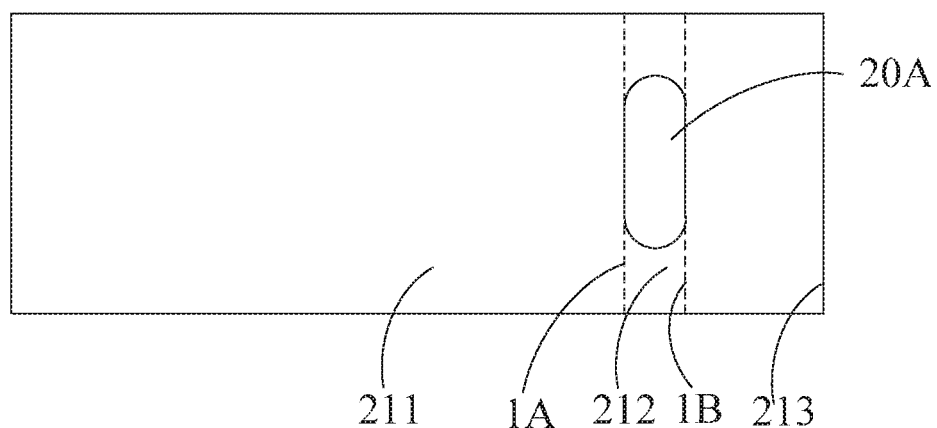
FIG. 8 is a front view of an electronic device in a third unfolded state in some embodiments of the present disclosure.
Figure 9:
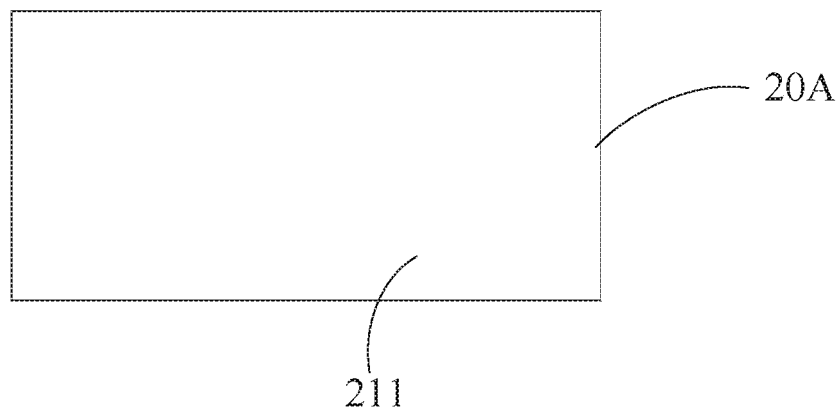
FIG. 9 is a front view of an electronic device in a third folded state in some embodiments of the present disclosure.
Figure 10:
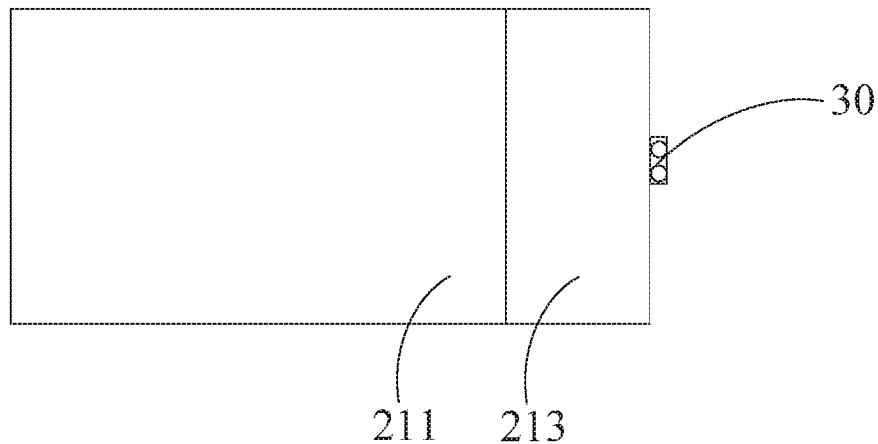
FIG. 10 is a back view of an electronic device in a third folded state in some embodiments of the present disclosure.

Referring to FIG. 8 to FIG. 10 simultaneously, the opening 20A is distributed in the transition region 212, and edges of two sides of the opening are adjacent to an edge of the first region 211 and an edge of the second region 212 respectively, wherein the opening 20A is substantially rectangular, rounded rectangular or strip-shaped, and a width of the opening 20A is substantially identical to a width of the folded region 212, and is also substantially identical to a width of the middle frame 10.

In the embodiment, the electronic device further includes a functional component 30. A mounting hole is defined in a top end of a side of the middle frame 10 neighboring the opening 20A. The functional component 30 is extendably mounted in the mounting hole. In the folded state, the opening 20A just exposes an area where the top end is provided with the mounting hole, and the functional component 30 can protrude from the mounting hole when it needs to be used. The functional component 30 is retracted in the mounting hole when no needs to be used. The functional component 30 can include a camera, a receiver, a sensor, and the like.

The functional component 30 is disposed on a side of the middle frame 10 neighboring the opening 20A. When the flexible display panel 20 is in a folded status, an edge portion of the functional component 30 is located in the opening 20A, where the functional component 30 includes a camera, a receiver, a sensor, and the like.

It can be understood that the opening 20A can further be distributed only in the second display region, and after being folded, the opening exposes the functional component disposed on the back surface of the middle frame 10.

Figure 11:
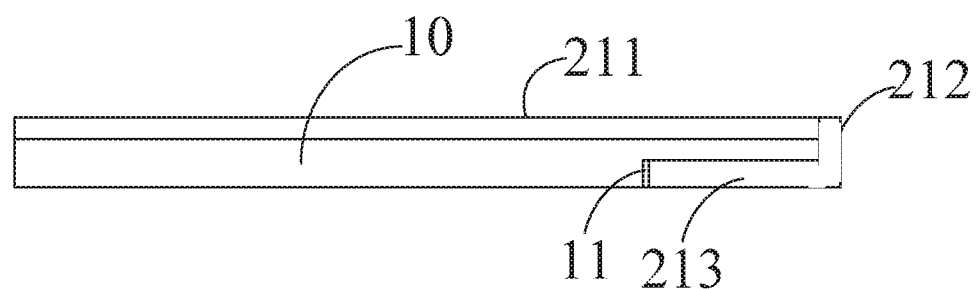
FIG. 11 is a perspective diagram of an electronic device in a fourth folded state in some embodiments of the present disclosure.

Referring to FIG. 11, in some embodiments, a receiving hole 11 is defined in a side of a back surface of the middle frame 10 neighboring the opening. When being folded, the second display region 213 of the substrate 21 is just received in the receiving hole 11. Further, a size of the receiving hole is the same as a size of the second display region. After being folded, a front surface of the second display region is aligned with the back surface of the middle frame 10.

Figure 12:
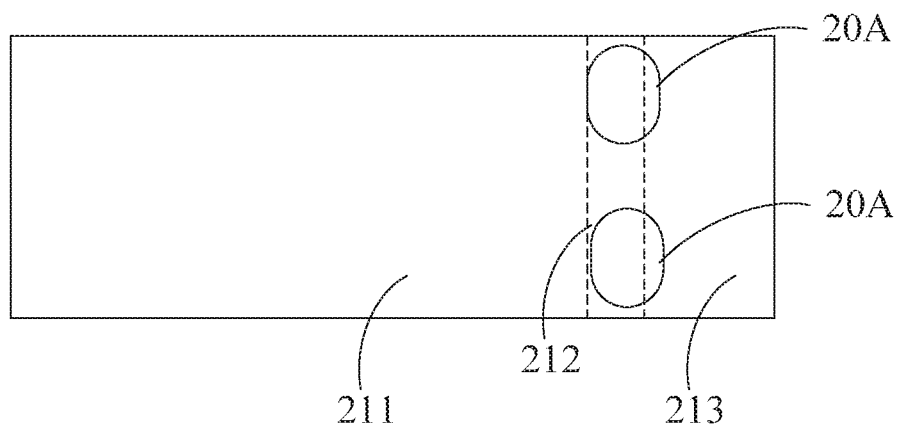
FIG. 12 is a front view of an electronic device in a fifth unfolded state in some embodiments of the present disclosure.

Referring to FIG. 12, in some embodiments, a number of the at least one opening 20A is two. The two openings 20A are defined side by side. Each of the two opening passes across the transition region 212 and the second display region 213. Of course, it can be understood that both of the two openings 20A can also pass across the first display region 211, the transition region 212, and the second display region 213. Or, both of the two openings 20A can be only located in the transition region 212.

In some embodiments, the electronic device further includes an encapsulation structure that fixes the first display region and the second display region to the front surface and the back surface of the middle frame, respectively.

The embodiments of the present disclosure have been described in detail above, and the principles and embodiments of the present disclosure are described in detail herein. The description of the above embodiments is only for the purpose of understanding the present disclosure. At the same time, the specific embodiments and application ranges can be changed by those skilled in the art according to the idea of the present disclosure. In conclusion, the content of the specification should not be construed as limiting the disclosure.

What is claimed is:

1. An electronic device, comprising:
   a middle frame;
   a flexible display panel disposed on the middle frame;
   a first bending portion and a second bending portion formed at the flexible display panel, wherein the first bending portion and the second bending portion divide the flexible display panel into a first display region, a second display region; and a transition region located between the first bending portion and the second bending portion; and
   at least one opening defined in the flexible display panel and defined in one or more regions among the first display region, the second display region, and the transition region;
   wherein the first display region of the flexible display panel is positioned on a front surface of the middle frame, and the second display region of the flexible display panel is positioned on a back surface of the middle frame; and
   wherein the electronic device comprises a functional component disposed on the back surface of the middle frame, wherein an edge portion of the functional component is located in the at least one opening when the electronic device is folded.

2. The electronic device according to claim 1, wherein the functional component comprises a receiver and a camera.

3. The electronic device according to claim 1, wherein the middle frame comprises two length-sides and two wide-sides, wherein the transition region is opposite to one of the two wide-sides or opposite to one of the two length-sides.

* * * * *